United States Patent
Bönsch et al.

(10) Patent No.: US 8,604,228 B2
(45) Date of Patent: Dec. 10, 2013

(54) METHOD FOR PURIFYING FATTY ACID ALKYL ESTER GREATLY LOADED WITH SAPONIFICATION PRODUCTS

(75) Inventors: Rudolf Bönsch, Nackenheim (DE); Eckhard Seidel, Frankfurt am Main (DE); Helmut Saft, Niddatal (DE)

(73) Assignee: Lurgi GmbH, Frankfurt am Main (DE)

( * ) Notice: Subject to any disclaimer, the term of this patent is extended or adjusted under 35 U.S.C. 154(b) by 0 days.

(21) Appl. No.: 13/394,878

(22) PCT Filed: Jun. 22, 2010

(86) PCT No.: PCT/DE2010/000702
§ 371 (c)(1),
(2), (4) Date: Apr. 26, 2012

(87) PCT Pub. No.: WO2011/032528
PCT Pub. Date: Mar. 24, 2011

(65) Prior Publication Data
US 2012/0203017 A1 Aug. 9, 2012

(30) Foreign Application Priority Data
Sep. 15, 2009 (DE) .................... 10 2009 041 120

(51) Int. Cl.
*C07C 51/42* (2006.01)
*C11B 3/00* (2006.01)
*C11B 1/00* (2006.01)

(52) U.S. Cl.
USPC .......................................... 554/204

(58) Field of Classification Search
USPC .......................................... 554/204
See application file for complete search history.

(56) References Cited

U.S. PATENT DOCUMENTS

| 8,193,383 B2 | 6/2012 | Saft et al. |
| 8,288,574 B2 | 10/2012 | Boensch et al. |
| 2008/0040970 A1 | 2/2008 | Davanzo |

FOREIGN PATENT DOCUMENTS

| AT | 397966 B | 8/1994 |
| CA | 2626129 A1 | 4/2006 |
| DE | 102006044467 A1 | 4/2008 |
| DE | 102007056703 A1 | 6/2009 |
| WO | 2007020465 A1 | 2/2007 |
| WO | WO 2007020465 A1 * | 2/2007 |
| WO | 2009065452 A1 | 5/2009 |
| WO | WO 2009065452 A1 * | 5/2009 |

OTHER PUBLICATIONS

Aleks Kac: "The FOOLPROOF way to make biodiesel", Jun. 18, 2008; "The Process", "First Stage" and "Second Stage".
Charles Peterson, Gregory Moeller, Randall Haws, Xiulin Zhang, Joseph Thompson and Daryl Reece: "Optimization of a Batch Type Ethyl Ester Process", Jul. 7, 2008.
Encinar et al.: "Ethanolysis of used frying oil. Biodiesel preparation and characterization", Fuel Processing Technology, Elsevier BV, NL LNKD- DOI: 10.1016/J.Fubroc.2007.01.002, vol. 88, No. 5, Mar. 31, 2007; pp. 513-522, ISSN: 0378-3820; p. 515, right-hand column, paragraph 2.
International Search Report for application PCT/DE2010/000702 dated Sep. 12, 2010.

* cited by examiner

*Primary Examiner* — Deborah D Carr
(74) *Attorney, Agent, or Firm* — Norris McLaughlin & Marcus PA

(57) ABSTRACT

A method for the continuous extraction of impurities, in particular saponification products, from a fatty acid alkyl ester phase produced by transesterification of vegetable or animal oils or fats with a great tendency to form saponification products, by means of an aqueous, acid glycerol phase containing a complexing agent.

11 Claims, No Drawings

METHOD FOR PURIFYING FATTY ACID ALKYL ESTER GREATLY LOADED WITH SAPONIFICATION PRODUCTS

"This application is a 371 National Phase application of PCT/DE2010/000702 filed Jun. 22, 2010, which claims priority to German application 10 2009 041120.8 filed Sep. 15, 2009."

This invention relates to a method for the continuous extraction of impurities, in particular saponification products, from a fatty acid alkyl ester phase by mixing with a glycerol phase.

In the transesterification of oils or fats of vegetable or animal origin by a method for producing biodiesel, as it is described for example in DE 10 2006 044 467 A1, a crude alkyl ester initially is obtained, which depending on the kind of oil or fat used is more or less loaded with impurities. Usable biodiesel only is obtained by separating these impurities from the crude alkyl ester. These impurities consist of mucilage residues originating from the oil or fat and of saponification products which originate from a reaction of the free fatty acid (FFA) contained in the oil or fat used with the alkaline catalyst used for the transesterification reaction, in general NaOH. In the transesterification of certain oils, such as e.g. jatropha oil, the fatty acid alkyl esters obtained in the transesterification also react with the sodium hydroxide solution used as catalyst and saponify in part.

Methods for separating the impurities from the fatty acid alkyl ester phase are known.

In DE 10 2006 044 467 B4 the purification of the crude alkyl ester is effected by means of washing with 1 to 5% hydrochloric acid. In the process, the acid neutralizes the alkaline catalyst and decomposes the soaps by converting them into FFA.

A disadvantage of this purification method consists in that the FFAs obtained thereby remain in the alkyl ester phase because of their water-repellent property caused by the non-polar hydrocarbon chain of their molecule and do not pass over into the acid, aqueous washing phase. Since FFAs generally are undesirable in the biodiesel, the standard EN 14214 specifies a maximum value, this method therefore only is applicable when the amount of saponification products in the crude alkyl ester is not too high.

It is also known to the skilled person that extracting the saponification products from fatty acid alkyl ester by means of pH-neutral water likewise cannot be carried out at high contents of saponification products. The reason for this on the one hand is that under these conditions a very stable emulsion is formed during the necessary intensive mixing of the fatty acid alkyl ester and the extraction water, from which emulsion the ester phase only can be separated with great ester losses. Moreover, the facilities used for extraction, such as washing column or mixer-settler, very quickly are contaminated and clogged by the saponification products.

In DE 43 01 686 C1 it is proposed to completely omit the use of an aqueous phase in the purification of the fatty acid alkyl ester phase and instead use glycerol for removing impurities. Subsequently, the residual alkalinity of the ester phase should be removed by treatment with an adsorbent, such as bleaching earth or silicic acid.

As an advantage of this method it is indicated that it does not require a water phase and the expenditure for reprocessing the same. A disadvantage, however, must be seen in that the absorption capacity of a water-free, alkaline glycerol phase for polar impurities such as excess alcohol or soaps is not very great. In addition, the use of adsorbents involves considerable costs and produces residues to be disposed of.

Because the above-described methods for purifying fatty acid alkyl ester greatly loaded with saponification products are not suitable for technical or economic reasons, it therefore has been the object to provide a method for prepurification, with which the soap loading can be lowered to such an extent that one of the known methods can be used for the further purification.

In accordance with the invention, this object is solved in that for purification the fatty acid alkyl ester phase is mixed with an acid, aqueous glycerol phase, subsequently referred to as washing glycerol phase, which contains glycerol and 5 to 40 wt-% of water and a complexing agent, and whose pH value lies between 3 and 6, preferably between 4 and 5.

Further developments, advantages and possible applications of the invention can also be taken from the following description. All features described form the subject-matter of the invention per se or in any combination, independent of their inclusion in the claims or their back-reference.

The acid contained in the washing glycerol phase neutralizes the alkaline transesterification catalyst and hence prevents a further saponification of the ester. The complexing agent, preferably citric acid, serves to bind polyvalent alkaline earth cations which were introduced into the transesterification process with the oil or fat, such as Ca, Mg, Fe and Cu ions, to form complexes and hence prevent the formation of alkaline earth soaps hardly soluble both in the ester and in the washing glycerol phase.

Due to the water content, the polarity of the washing glycerol phase is increased and hence the absorption capacity for the soaps to be removed from the ester phase and for other polar impurities, such as excess methanol or ethanol.

A particularly advantageous use of this method consists in integrating the same into a plant for producing biodiesel by transesterification of vegetable and animal oils or fats and process-internally recover the washing glycerol phase used for extraction. Directly or via a hold-up tank, the fatty acid alkyl ester phase to be purified is supplied to the process of the invention from the settling tank of the last transesterification stage via a heat exchanger. The washing glycerol phase used according to the invention is process-internally recovered by reprocessing the glycerol phase obtained during the transesterification. By means of an acid water wash of saponification products, the same is purified and liberated from methanol or ethanol by distillation. In a further distillation treatment, the water content of the glycerol phase required for use in the method according to the invention is adjusted. Subsequently, the powdery complexing agent is dissolved in the glycerol phase. To provide for a continuous operation, two batching tanks or batching systems operated in parallel preferably are used for this purpose. From there, the glycerol phase is supplied to the process according to the invention as washing glycerol phase.

The fatty acid alkyl ester phase purified by the method according to the invention subsequently is liberated from residual saponification products by means of an acid water wash and dried by evaporating the water content, and hence is present as biodiesel ready for use.

In a particularly advantageous aspect of the method, mixing the fatty acid alkyl ester phase and the washing glycerol phase is effected by means of an extraction column, wherein the fatty acid alkyl ester phase ascends in the column from the bottom to the top in the washing glycerol phase.

As an alternative to the use of an extraction column it is possible that the method is carried out in counterflow by means of an at least two-stage, preferably three-stage mixer-settler, wherein preferably mechanical intensive mixers integrated into the conduit are used.

Advantageously, the method is carried out at ambient pressure, the containers are charged with nitrogen, and the fatty acid alkyl ester phase is supplied to the method with a temperature between 40 and 70° C., in particular between 55 and 65° C. Lower temperatures would increase the viscosity of the ester phase and the washing glycerol phase and hence reduce the intensive mixing of the phases and thus the effectiveness of the method. Higher temperatures, on the other hand, would lead to an increased outgassing of methanol from the ester phase and hence cause a risk of explosion.

The invention will now be explained by the following examples:

EXAMPLE 1

For carrying out the purification of fatty acid methyl ester, obtained from jatropha oil by means of a two-stage transesterification process, an extraction column with an inside diameter of 5 cm and a total height of 1.5 m is used. The column contains a structured packing of the type Montz M/MN, B-1 with a specific surface of 250 $m^2/m^3$, made of polypropylene. The height of the structured packing is 1.0 m. The inlet of the extracting agent, the glycerol phase with which the column is filled, is located at the top of the column. Beside glycerol, the glycerol phase contains 15 wt-% water and is mixed with citric acid. By adding the citric acid, the pH value is adjusted to the value of 6. The continuous inflow of glycerol phase to the column is 125 g/hour.

The outlet of the extract, the loaded glycerol phase, is located at the bottom of the column, at the lowest point. At the bottom of the column, below the structured packing, the fatty acid methyl ester phase to be purified is supplied and, comminuted to droplets inside the glycerol phase, ascends to the top of the column and is withdrawn from the column at the highest point. The continuous inflow of the fatty acid methyl ester is 2,500 g/hour. Since the transesterification process has been base-catalyzed, the ester phase has a pH value of 9, contains 4 wt-% saponification products, 9 wt-% methanol, 0.4 wt-% total glycerol and 100 ppm water. The purified fatty acid methyl ester stream emerging at the top of the column amounts to 2168 g/hour. It contains 0.05 wt-% saponification products, 1 wt-% methanol, 0.35 wt-% total glycerol and 0.2 wt-% water and has a pH value of 7. The extraction was carried out at atmospheric pressure and at 65° C. No visible deposits of saponification products were formed in the column.

EXAMPLE 2

Instead of the extraction column used in Example 1, a three-stage mixer-settler is used in this example. In each stage, mixing is effected by means of an intensive mixer of the type ULTRA TURRAX UTL integrated into the conduit. The retention time in the three settling tanks each is one hour. The material streams entering the mixer-settler have the same composition and size as in Example 1. To the mixer of the first mixer-settler stage, the fatty acid methyl ester stream to be purified and the stream of the glycerol phase from the settling tank of the second mixer-settler stage are supplied. The temperature of the fatty acid methyl ester stream is 65° C. To the mixer of the third mixer-settler stage, the glycerol phase used as extracting agent and the ester phase from the settling tank of the second mixer-settler stage are supplied. By means of a heat exchanger installed between the mixer and the settling tank of the third mixer-settler stage the temperature of the mixture is lowered to 25° C., in order to lower the solubility of the fatty acid methyl ester in the glycerol phase and hence the loss of fatty acid methyl ester. Therefore, the purified fatty acid methyl ester phase leaves the settling tank of the third mixer-settler stage with a flow rate of 2,190 kg/hour and in the same composition as in Example 1.

The invention claimed is:

1. A method for the continuous extraction of impurities, from a fatty acid alkyl ester phase comprising mixing the fatty acid alkyl ester phase with a glycerol phase, wherein the admixed glycerol phase contains 5 to 40 wt-% water and an additional complexing agent and, further wherein its pH value is 3 to 6.

2. The method according to claim 1 wherein the aqueous glycerol phase is obtained process-internally.

3. The method according to claim 1 wherein the method is carried out by means of an extraction column, wherein in the column the fatty acid alkyl ester phase flows from the bottom to the top and in the glycerol phase.

4. The method according to claim 1 wherein the method is carried out in counterflow by means of an at least two-stage, preferably three-stage mixer-settler, wherein preferably mechanical intensive mixers integrated into the conduit are used.

5. The method according to claim 1 wherein the fatty acid alkyl ester phase is supplied to the method with a temperature between 40 and 70° C.

6. The method according to claim 1 wherein the method is carried out at ambient pressure and the tanks are charged with nitrogen.

7. The method according to claim 1 wherein citric acid is used as complexing agent.

8. The method according to claim 1 wherein the impurities are saponification products.

9. The method according to claim 1 wherein the pH value is between 4 to 5.

10. The method according to claim 1 wherein the fatty acid alkyl ester phase is produced by transesterification of vegetable or animal oils or fats.

11. The method according to claim 5 wherein the temperature is between 55 and 65° C.

* * * * *